(12) United States Patent
Wetzel et al.

(10) Patent No.: US 8,579,256 B2
(45) Date of Patent: Nov. 12, 2013

(54) VALVE

(75) Inventors: Winfried Wetzel, Hergensweiler (DE); Jochen Weil, Bodolz (DE); James William Davidson, Mason, OH (US); Alain Fuoc, Illzach (FR); James E. Vortkamp, Cincinnati, OH (US)

(73) Assignee: Xomox International GmbH & Co., Lindau/Bodensee (DE)

( * ) Notice: Subject to any disclaimer, the term of this patent is extended or adjusted under 35 U.S.C. 154(b) by 456 days.

(21) Appl. No.: 12/809,903

(22) PCT Filed: Dec. 19, 2008

(86) PCT No.: PCT/EP2008/010963
§ 371 (c)(1),
(2), (4) Date: Sep. 22, 2010

(87) PCT Pub. No.: WO2009/080329
PCT Pub. Date: Jul. 2, 2009

(65) Prior Publication Data
US 2011/0012044 A1 Jan. 20, 2011

(30) Foreign Application Priority Data

Dec. 20, 2007 (DE) .................. 20 2007 017 968 U
Aug. 27, 2008 (DE) .................. 20 2008 011 406 U

(51) Int. Cl.
*F16K 5/06* (2006.01)
(52) U.S. Cl.
USPC ............... 251/315.13; 251/315.01; 251/315.1
(58) Field of Classification Search
USPC .................... 251/214, 315.01, 315.03, 315.1, 251/315.13, 315.16
See application file for complete search history.

(56) References Cited

U.S. PATENT DOCUMENTS

| 2,719,022 | A | | 9/1955 | Blevans |
| 4,696,323 | A | * | 9/1987 | Iff ................................ 137/375 |
| 6,129,336 | A | | 10/2000 | Sandling et al. |
| 7,080,822 | B2 | * | 7/2006 | Tulaskar .................. 251/315.01 |
| 2005/0104026 | A1 | | 5/2005 | Tulaskar |

FOREIGN PATENT DOCUMENTS

| CA | 2206953 | 11/1997 |
| DE | 3023230 | 1/1982 |
| DE | 4104003 | 10/1991 |
| EP | 1047894 | 11/2003 |
| GB | 1556074 | 11/1979 |

* cited by examiner

*Primary Examiner* — John K Fristoe, Jr.
*Assistant Examiner* — Angelisa Hicks
(74) *Attorney, Agent, or Firm* — Jordan and Hamburg LLP

(57) ABSTRACT

A valve includes a housing, a rotational body, two seat rings, a shaft integrally linked to the rotational body, and a sealing element. The rotational body is arranged rotatably in the housing and has a through-opening. The seat rings are spaced apart in the housing, each positioned against an outer surface of the rotational body to seal against leakage. The shaft extends outwardly through a housing opening. Part of the shaft has a spherical outer surface. The sealing element is positioned against the spherical outer surface, and includes a sealing lip and a support ring. The support ring has a spherical inner surface with a curvature corresponding to the spherical outer surface. The shaft is supported on the support ring at the shaft part's spherical outer surface. A flow path is defined by a housing through-opening and a rotational body through-opening, and is closed or at least partially open as determined by a rotational angle position of the rotational body about a rotational axis. The rotational body and shaft move together pivoting about a pivot axis that is orthogonal to the rotational axis. The pivot axis is determined by the shaft part's spherical outer surface.

17 Claims, 9 Drawing Sheets

VALVE

BACKGROUND OF THE INVENTION

The present invention relates generally to a valve, and more particularly to a valve having a housing and a rotational body, such as a spherical rotational body, arranged rotatably therein.

A ball valve is described in EP 1 047 894 B1 having a separately embodied shaft mechanically linked to a spherical rotational body of the valve. The rotational body includes a passage for a flow medium. The interior of a housing includes two seat rings that are spaced apart in the direction of flow. The rings are sealingly positioned against the outer spherical surface of the rotational body. A rectangular part of the shaft engages in a correspondingly embodied seat of the rotational body and is conducted through an opening in the housing to the outside. The rotational body may be rotated by means of a lever or the like into the desired position for closing or at least partially opening the flow path. Because the rotational body and shaft are embodied as two parts, in the closed position the floatingly arranged rotational body is pressed more strongly against the downstream seat ring due to a difference in pressure. Also, movements of the rotational body caused by the flow medium or the differences in pressure are to be kept away from the shaft. In the area of the housing opening the shaft includes a part having a spherical outer surface against which is positioned a sealing element arranged in the housing. The sealing effect of the sealing element is heightened by the pressure of the flow medium in the housing interior enhancing the so-called external seal. It is intended that the spherical outer surface of the aforesaid shaft part will ensure that the external seal will not be negatively affected by axial movements of the shaft or by pivot movements introduced from outside, such as by the lever. It has been found that due to the embodiment of rotational body and shaft in two parts, practically no pivot movements or at least only negligible pivot movements, are exerted on the shaft.

A ball valve is also described in DE 30 23 230 A1, in which a rotational body and shaft are embodied integrally. The inner surfaces of a housing, which surfaces receive the spherical rotational body and the shaft, are provided with a common liner or coating made of plastic. The outer surfaces of the rotational body and the shaft embodied integrally therewith are also provided with a coating or liner made of plastic. A gland packing seal is arranged in the housing opening for the shaft for sealing purposes. Because the shaft and the rotational body are integrally embodied, forces are transmitted directly onto the shaft by the flow medium or by differences in pressure, especially when the rotational body is in the closed position. The result is that local load peaks and quite high surface pressures occur between the shaft liner and the gland packing. These shorten the tool life and service life and can lead to elevated leak rates, even after relatively short operating times.

Another valve is described in EP 0 809 059 B1 having a housing interior provided with a plastic liner. A rotational body and shaft likewise have a liner or coating made of plastic. The rotational body is borne floating in the housing by means of support rings arranged spaced apart in the direction of flow. The inner end of the shaft, which shaft is provided with the aforesaid liner or coating at least in the interior of the housing, engages in a correspondingly embodied recess of the rotational body. The recess also is lined with plastic. The shaft being engaged in the recess can rotate the rotational body for closing or opening the flow path. Sufficient clearance between the aforesaid recess of the floatingly borne rotational body and the engaging shaft end is required to prevent axial movements from being transmitted to the shaft, especially axial movements due to differences in pressure or pressure fluctuations in the flow medium. Production and manufacture of the aforesaid connection requires complexity that is not insignificant. Furthermore, hysteresis and/or positional differences between the angle of rotation position for the shaft and the angle of rotation position for the rotational body may occur, which are disadvantages. These disadvantages are especially noteworthy for a control valve and/or in automated systems in which drives are provided that are suitable for rotating the shaft and ultimately the rotational body. Still further, a special double seal provided in the area of the shaft opening requires a not insignificant structural volume and correspondingly complex production and assembly.

Accordingly, there is a need for a valve with low structural complexity capable of avoiding the aforesaid disadvantages and having a long tool life and long service life. There also is a need for a valve capable of tolerating aggressive flow media that can avoid damage from such media's corrosive effects and/or from external influences such as ambient humidity. Moreover, disadvantageous influences on the sealing of the shaft are to be avoided. Accordingly, an object of the present invention is to provide a valve that is functionally reliable having optimized sealing and a longer tool life, especially when used at high pressures or high temperatures.

SUMMARY OF THE INVENTION

The present invention provides a valve having a simple, yet functionally reliable design. The valve includes a rotational body and shaft that are securely joined to one another so as to be integrally embodied. The valve has an opening, and in the area of the opening the shaft includes a part having a spherical outer surface. The shaft is surrounded by a support ring that has a spherical inner surface that corresponds at least approximately to the spherical outer surface of the shaft part. The spherical outer surface of the shaft part is positioned against the spherical inner surface of the support ring, creating a pivot bearing about pivot axes. A center of the pivot bearing is defined by the center point and/or the center of the aforesaid spherical surfaces and/or is disposed at least approximately on a common rotational axis for the shaft and the rotational body. An annular sealing element is arranged in an annular gap of the opening between the shaft and the housing. The sealing element may have an X-shaped section. In the area of the spherical outer surfaces, the sealing element may have an annular part or support ring with increased stiffness. A bearing for the shaft is formed by the sealing element, the support ring, the spherical part of the shaft, and the rotational body about axes that run at least approximately orthogonal to the common rotational axis for the rotational body and shaft.

In accordance with the invention, a reliable external seal occurs and the rotational body is floatingly borne in the housing despite the shaft being securely joined to the rotational body. It shall be noted that due to changes in pressure or differences in pressures, especially in the closed position, the rotational body makes micro-movements essentially in the direction of the housing longitudinal axis. Such micro-movements may be on the order of magnitude of up to a few hundred micrometers.

The seal is attained in the opening with great reliability. Undesired external leaks are suppressed due to the spherically-shaped shaft part and correspondingly-shaped support ring, which is integrated in the sealing element. The inner sealing of the valve is also attained during the aforesaid micro-movements (e.g., pivot movements) by seat rings that are fixed in the housing. The valve thus includes an adjustable and/or self-adjusting shaft seal. In accordance with the invention a significantly improved and/or optimized seal of the shaft opening is attained by combining the seat rings and the support ring. In particular, the seat rings advantageously limit and/or reduce pressure load increases during the excursions and/or movements of the rotational body. The support ring is integrated into the sealing element in the area of the shaft part and its spherical inner surface.

In one refinement, the rotational body and the shaft are securely joined and have a common liner made of plastic, especially fluoroplastics such as PTFE, FEP, PFA, or TFA. Furthermore, the interior of the housing, including the shaft opening, are provided with such a plastic liner. In the area of the opening the plastic liner for the shaft has the aforesaid spherical outer surface that is positioned against the spherical inner surface of the support ring. The support ring is advantageously positioned radially outward against the liner of the housing in the area of the opening. Thus the mechanical conditions explained above also apply for valves whose housing and shaft with rotational body have plastic liners.

The sealing element advantageously includes at least one dynamic sealing lip, and preferably two dynamic sealing lips, that are positioned at least in part against the spherical outer surface of the shaft part or against the plastic liner thereon. The adjacent inner surface of the flexible sealing lip has two surfaces that are preferably substantially conical or spherical and that are arranged at an obtuse angle. Contact between the two surfaces may occur on the spherical outer surface. The line of intersection for the adjacent inner surface may be located within the contact surface in the unloaded condition in the area of the line of intersection for the two surfaces of the flexible sealing lip. As the load increases and/or due to the micro-movements by the rotational body and the resultant pivot of the shaft, the contact surface shifts towards the rotational axis. As a result, the contact surface enlarges and/or is displaced to the stiffer and/or stiffened part of the sealing element, advantageously increasing and/or improving the support for the shaft. Moreover, V-shaped seat rings may include flexible sealing lips having two preferably substantially conical or spherical surfaces that are arranged at an obtuse angle. When in the unloaded condition in the area of their line of intersection, the contact occurs on the spherical outer surface of the rotational body or its liner. When loaded the contact surface for the sealing lip is shifted to an area of increased stiffness such that at increased loads and/or given larger movements, the rotational body is supported on the aforesaid area.

Special refinements and embodiments of the invention are provided in the following description of exemplary embodiments and in the dependent claims. The exemplary embodiments relate to ball valves and valves having a rotational body embodied as a sphere. However, the invention also encompasses valves having other rotational bodies such as conical cock plugs or flaps. Regardless of the embodiment of the valve, whether ball valve, tap cock, flap valve, or the like, advantages of the invention are achieved due to the fixed and preferably integral embodiment of shaft and rotational body in combination with pivotability in the area of the shaft opening, about axes that run essentially orthogonal to the rotational axis.

DETAILED DESCRIPTION OF THE INVENTION

Figure 1:
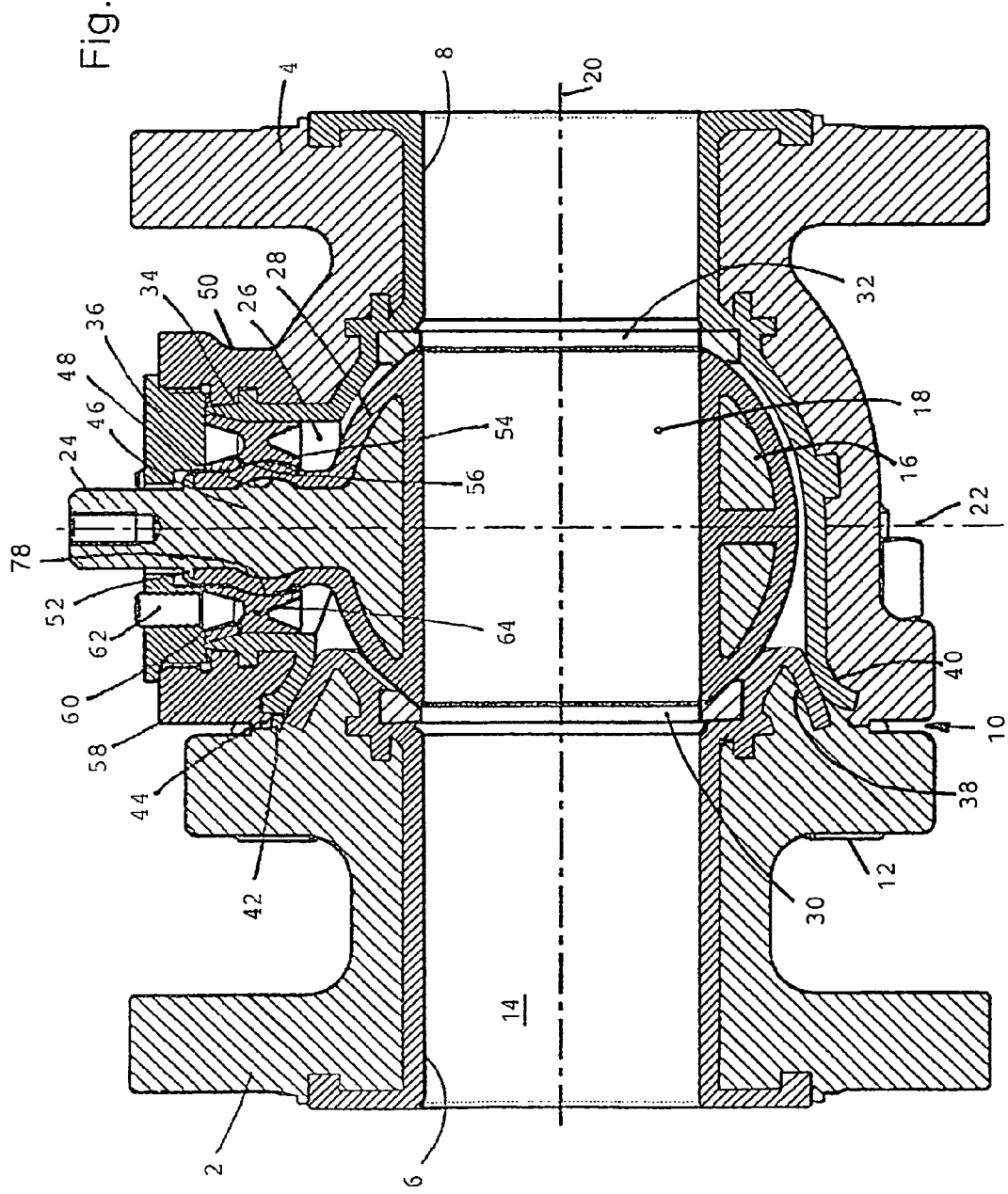
FIG. 1 is a schematic diagram of an axial section of a ball valve in accordance with an embodiment of the present invention.

In accordance with FIG. 1, a ball valve includes a housing having two housing parts 2, 4 that are interiorly lined with plastic liners 6, 8. The housing may comprise a metal. The housing parts 2, 4 are joined to one another by screws 12 in a connecting area 10, such as at a flange connection. The liners 6, 8 delimit the flow channel 14 for a flow medium and are disposed in the interior of the housing. Arranged in the interior of the housing is a spherical rotational body 16 that includes a through-opening 18 and that can be rotated about a rotational axis 22 that is orthogonal to the longitudinal axis 20 of the housing. In the depicted open position the flow medium can flow freely through the through-opening 18 and thus through the valve. After the rotational body 16 has been rotated 90° with respect to the rotational axis 22, the rotational body 16 assumes its closed position for closing the flow path.

A shaft 24 is securely joined to the rotational body 16. The rotational body 16 and the shaft 24 preferably are embodied integrally. The shaft 24 penetrates an opening 26 in the housing part 4 to the outside. A suitable actuating element such as a lever, hand wheel, or for instance an electrical rotational drive, may be connected to the free end of the shaft 24 (being disposed on the outside) to rotate the rotational body 16 into the desired position. The rotational body 16 and the shaft 24 are enclosed in a common liner or covering 28. Such covering may be present inside the rotational body 16 in the through-opening 18. The rotational body 16 is supported by two seat rings 30, 32 that are spaced apart from one another in the direction of the longitudinal axis 20. The two seat rings 30, 32 are fixed in the liner 6, 8 such that inner sealing of the ball valve is assured when the rotational body 16 is in the closed position. Furthermore, arranged in the area of the opening 26 is an annular sealing element 34 made of elastomer and/or elastic material, such as plastic. The annular sealing element 34 has an X-shaped cross-section and is fixed by a cover 36. Preferably, the cover 36 is detachably connected to the housing part 4 by screws or the like (not shown).

It is particularly significant that the liners 6 and 8 for the housing parts 2, 4 extend into the area of the opening 26, specifically in the housing part 4 up to the cover 36. Moreover, the liners 6, 8 may be conical, each being provided with end parts 38, 40 from the opening 26 approximately down to the connecting area 10. The end parts 38, 40 are positioned tight against one another. Because of a pre-specified and preferably conical overlapping, the liners 6, 8 absorb reliably, especially changes in temperature. Additional loading or overloading and/or impermissible deformation of the liner during assembly and operation, especially by pipe forces, are reliably prevented due to the pre-specified metal overlay of the housing parts 2, 4. In the connecting area 10 the metal housing parts 2, 4 include centering collars 42, 44 that are coaxial with the longitudinal axis 20 to assure precise coaxial alignment of the housing parts 2, 4; and also to assure a connection that can withstand high loads. Because the end parts 38, 40 of the liners 6, 8 are positioned tightly against one another and/or are overlapping, the housing interior is encapsulated in a functionally reliable manner and sealed against the outside, even at high pressures and/or when there are changes in temperature.

In the area of the opening 26 the shaft 24 includes an expanded part 46 having a spherical outer surface 48. The liner 28 for the shaft 24 includes a correspondingly embodied spherical outer surface 50. The shaft 24 furthermore has a flange 52 at which the liner 28 terminates and is supported. The liner 28, which is especially made of a durable fluoroplastic that is resistant to high temperatures, has a propensity for cold flow and for enlargement given the effects of heat, but is held in a functionally reliable manner by the flange 52. Two sealing lips 54, 56 of the sealing element 34 are sealingly positioned against the liner 28 in the area of the spherical outer surface 50. The outer sealing lip 56 that faces the cover 36 is surrounded by an annular space 58 in which an annular body 60 is arranged. The cover 36 includes adjusting elements 62, such as screws, that act on the annular body 66 such that the pre-stress or the pressure of the outer sealing lip 56 is adjustable with respect to the liner 28. It is particularly significant that the shaft seal is embodied to be adjustable and/or self-adjusting.

Furthermore, a support ring 64 is provided that surrounds the shaft part 49 and is integrated into the X-shaped sealing element 34. The support ring 64 is arranged in the area of the radial expansion of the shaft 24 and/or between the spherical outer surface 50 of the liner 28 and the inner surface of the liner 8. The support ring 64 is embodied as an annular part of the sealing element 34. Radially inward the support ring 64 has a spherical inner surface 78 that conforms with and/or corresponds to the spherical outer surface 50 of the liner 28. The inner and outer sealing lips 54, 56, whose inner surfaces are continuously connected to the inner surface 78 of the support ring 64, are connected in both directions to the integrated support ring 64 coaxial with the rotational axis 22. The support ring 64 has significantly greater stiffness than the sealing lips 54, 56 of the sealing element to facilitate radial support of the shaft 24. The annular part 64 of the sealing element 34 forms the support ring for the shaft 24. The spherical outer surface 50 of the liner 28 for the shaft 24 in combination with the annular ring 24 allow the shaft 24 to pivot, as further explained below. It is noted that the inner surface 78 of the annular part or support ring 64 conforms with the spherical outer surface 50 and/or is embodied corresponding thereto.

Figure 2:
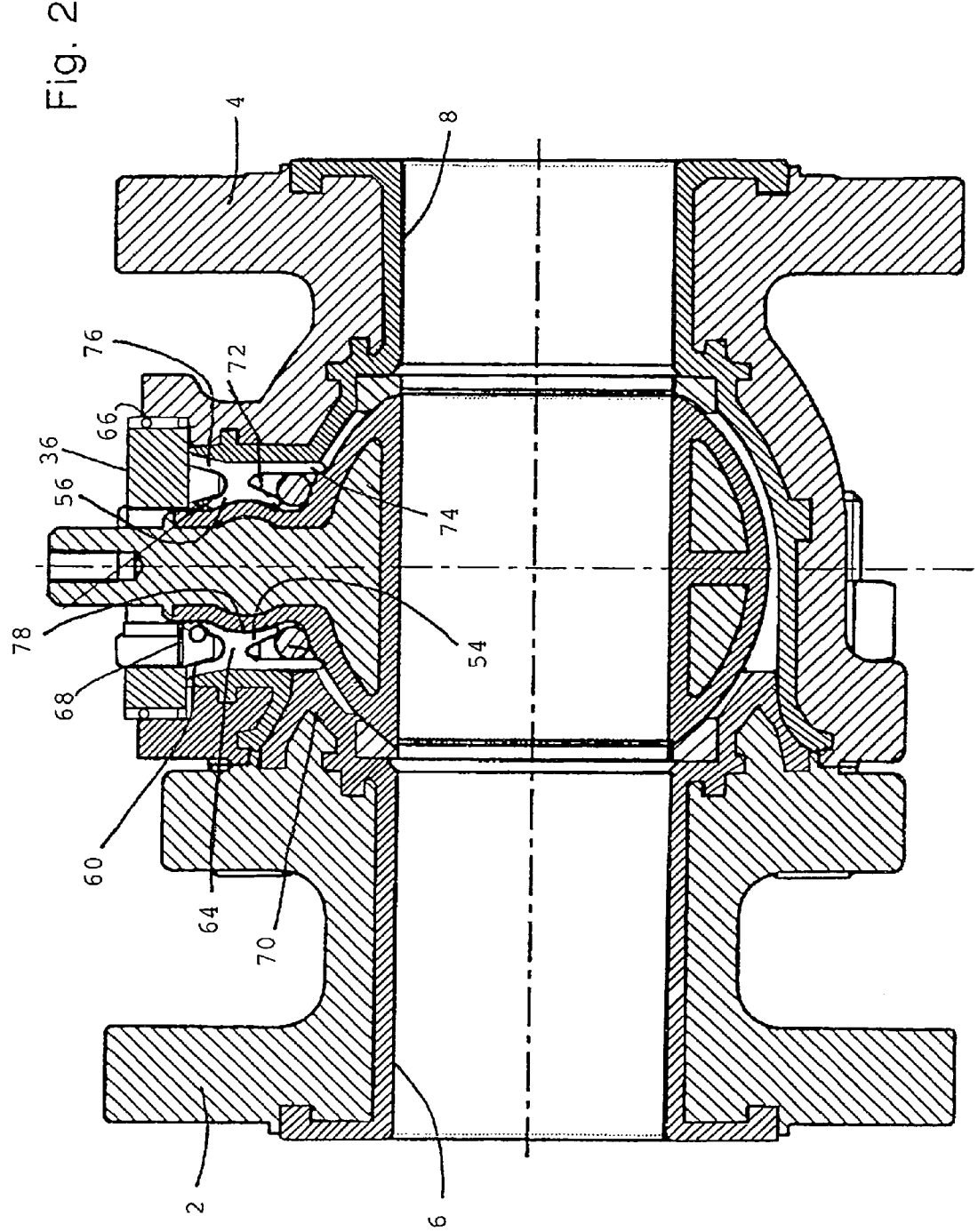
FIG. 2 is a schematic diagram of an axial section of another ball valve, in accordance with another embodiment of the present invention.

FIG. 2 depicts a valve which is similar to the valve of FIG. 1. Accordingly, the information described above for the valve of FIG. 1 applies for equivalent components of the valve of FIG. 2. A sealing ring 66 in the cover 36 seals the housing part 4 against the outside. The sealing ring 66 in particular prevents liquid from penetrating from outside and prevents the thread in the cover 36 or the threaded connection between the cover 36 and the housing 2 and 4 from corroding. The annular body 60 includes a groove within which an elastic ring 68 is located for acting on and pre-stressing the outer sealing lip 56. Furthermore, the inner sealing lip 54 is surrounded by an annular space 72 in which another elastic ring 70 is arranged for pre-stressing and/or for additional sealing. Two arms 74, 76 of the sealing element 34 are positioned against the inner surface of the liner 6, 8. The annular part 64 or support ring is also positioned radially outward against the inner surface of the liner 8. Radially inward its spherical inner surface 78 is positioned against the correspondingly embodied spherical outer surface 50 of the liner 28. Such positioning provides defined and/or functionally reliable support and/or bearing of the shaft 24 in the housing or in the housing part 4.

The support ring 64 also may be embodied independent of the sealing element. For example, it may be advantageous to arrange a separate sealing element, preferably having sealing lips and arms as in the foregoing, immediately on such a separate support ring 64 in the inward and/or outward direction of the rotational axis 22. The support ring has significantly greater stiffness and is preferably just as elastic as the sealing lips. The support ring forms a bearing for the expanded shaft part 46 at the shaft part's spherical outer surface 48 and/or for the surrounding liner 28 at the liner's spherical outer surface 50.

Figure 3:
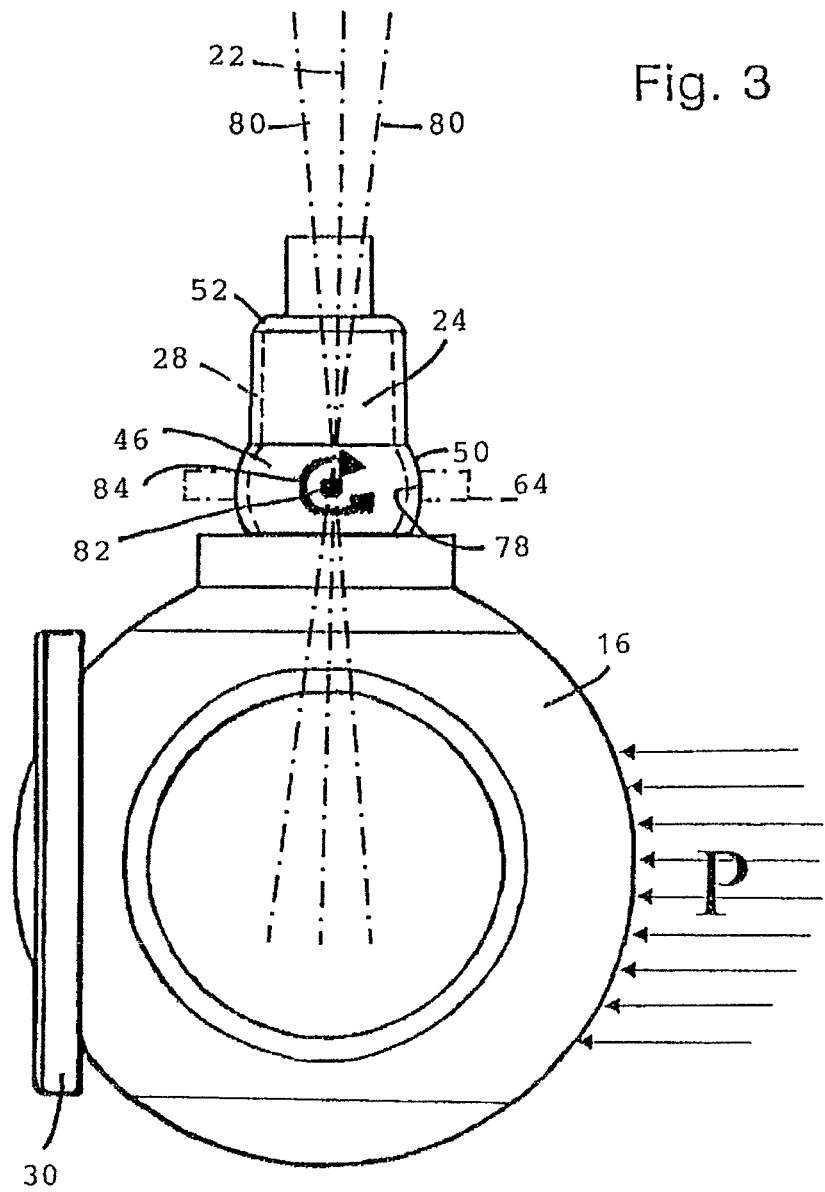
FIG. 3 is a diagram of a shaft with an integral spherical rotational body in the closed position, in accordance with an embodiment of the present invention.

FIG. 3 provides schematic depictions of the spherical rotational body 16 secured to and integrally embodied with the shaft 24, with the rotational body in the closed position. A liner 28 for the shaft 24 is depicted with a dashed line for the sake of simplicity. In this embodiment, the spherical inner surface 78 of the support ring 64 may be positioned directly against the spherical outer surface of the shaft part 46, supporting it. The support ring or the annular part 64 of the sealing element in the area of the expanded part 46 of the shaft 24 also is positioned against the spherical outer surface 50 of the liner. It is noted that the spherical inner surface 78 of the support ring 64 corresponds to the spherical outer surface 50 of the liner 28. Moreover, one seat ring 30 that is fixed in the liner of the housing part shown on the left in FIG. 1 is depicted in FIG. 3. The rotation body 16 is pressed more strongly against the seat ring 30, because of the pressure from the flow medium acting on the rotation body 16 in the closed position, or because of the changes in pressure P. The rotational body 16 can perform pivot movements about a pivot axis 82 in accordance with the dot-dash line 80, as indicated by the arrow 84 due to the bearing and/or support of the shaft by means of the support ring 64. The pivot axis 82 runs essentially orthogonal to the rotational axis 22 of the rotational body 16 due to the spherical embodiment of the outer surface 50 of the liner 28 for the shaft 24. The pivot axis 82 runs at least approximately through the center and/or center point of the spherical and/or ball-shaped outer surface 50. Furthermore, in accordance with the invention the support ring 64 surrounds the expanded shaft area 46 with a pre-determined axial extension, with respect to the rotational axis 22, such that the pivot axis 82 running through the aforesaid center runs radially through the support ring 64. Thus in accordance with the invention the rotational body 16 is floatingly borne in the housing without the shaft 24 being embodied as a separate component that enables relative movements.

Figure 4:
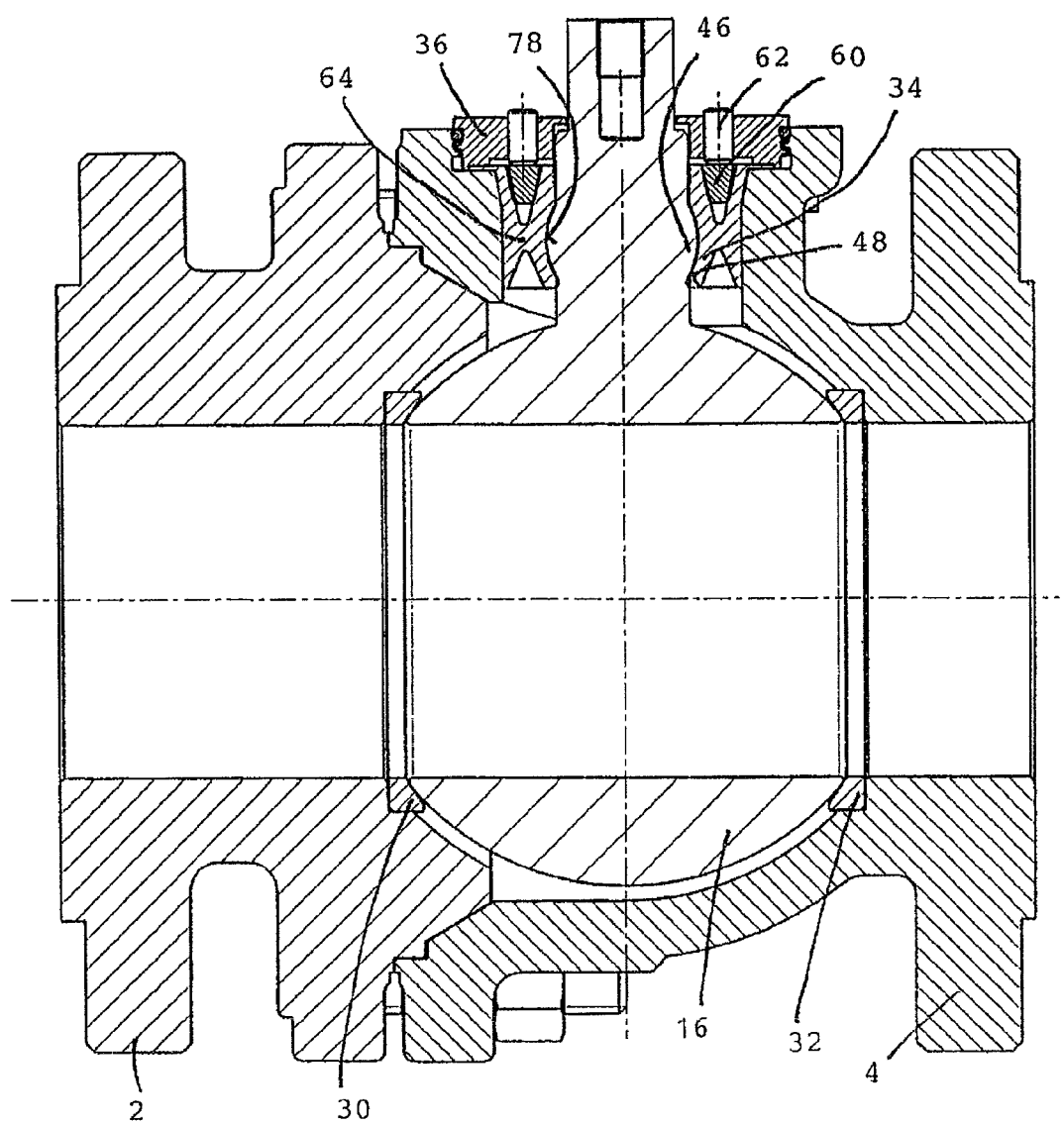
FIG. 4 is a schematic diagram of an axial section of a valve without a plastic liner, in accordance with an embodiment of the present invention.

FIG. 4 depicts a section through an axial plane of an exemplary embodiment whose housing parts 2, 4, rotational body 16, and shaft 24 connected thereto do not have any plastic liners. The support rings 30, 32 are fixed directly in the metal surfaces or areas of the housing parts 2 and 4. The spherical outer surface 48 of the expanded part 46 of the shaft 24 is positioned against the support ring 64. Furthermore, the inner and outer sealing lips of the sealing element 34 are positioned directly against the associated metal outer surfaces of the shaft 24 and/or its expanded part 46. The outer sealing lip of the sealing element 34 is pressed with adjustable pre-tension against the outer surface of the shaft 74 by the annular body 60. The sealing force may be adjusted as needed using adjusting elements 62 (e.g., screws) arranged in the cover 36. In addition, the information described above in connection with the valve embodiments having liners applies analogously to the depicted exemplary embodiment of the valve without liners.

The micro-movements that occur essentially in the longitudinal direction of the valve housing are limited by means of the seat rings 30, 32 while the sealing effect is retained for a long service life. The seat rings 30, 32 minimize the movements, consequently minimizing the pivot movements of the shaft 24, such pivot movement being depicted greatly enlarged in FIG. 3. A functionally reliable seal for the shaft opening that results in long tool life is attained between the seat rings and the support ring 64. The seat rings 30, 32 limit and/or reduce the excursion and/or movements of the rotational body 16 as the pressure increases. The support ring 64 preferably is integrated into the sealing element and is located in the area of the shaft opening. Accordingly, a significantly improved and/or optimized seal and/or long service life for the shaft opening is provided, with a simultaneous floating arrangement of the rotational body 16 in the valve housing 2, 4 and a secure connection to the shaft 24, using the inventive combination of the seat rings 30, 32 and the support ring 64.

Figure 5:
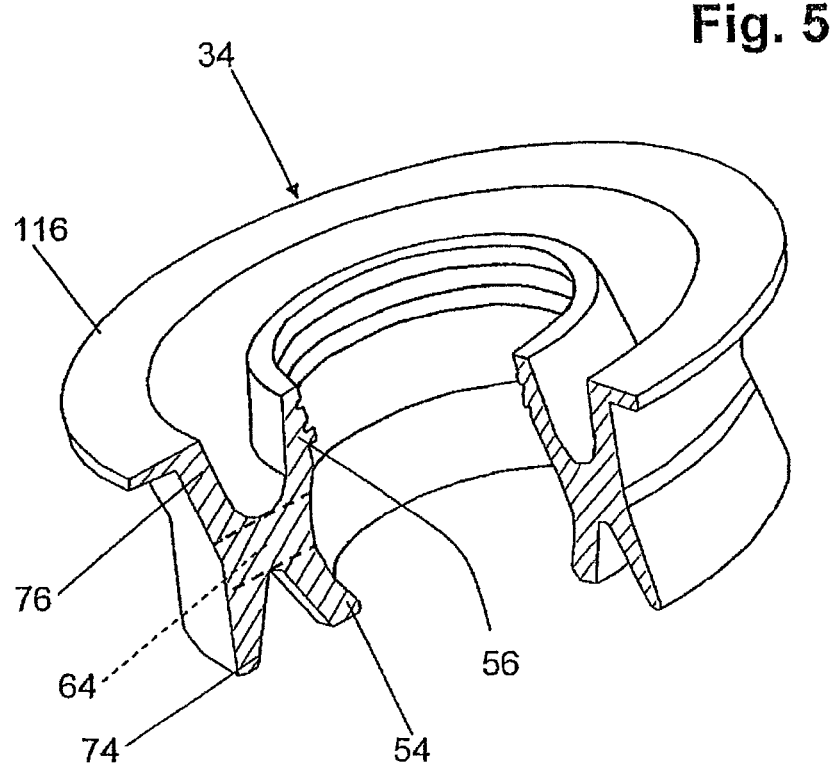
FIG. 5 is a perspective diagram with partial cut-away view of a sealing element with integrated support ring, in accordance with an embodiment of the present invention.

The annular sealing element 34 with the inner sealing lip 54, the outer sealing lip 56, and the support ring 64, which is continuous in the radial direction relative to the rotational axis of the rotational body, can be visualized well in the perspective and partial cut-away view in FIG. 5. A radially extending flange 116 is arranged integrally on the end of the outer arm 76 and is embodied as a sealing membrane between the housing part and the cover connected thereto for additional sealing against the outside. It should be noted that the inner sealing lip 54 is provided and embodied for dynamically sealing the shaft opening and the housing interior, while the outer sealing lip 56 is arranged and/or embodied for sealing against the outside. Thus functionally reliable and/or self-adjusting sealing of the shaft is attained in the area of the shaft opening using the two dynamic sealing lips 54 and 56.

Figure 6:
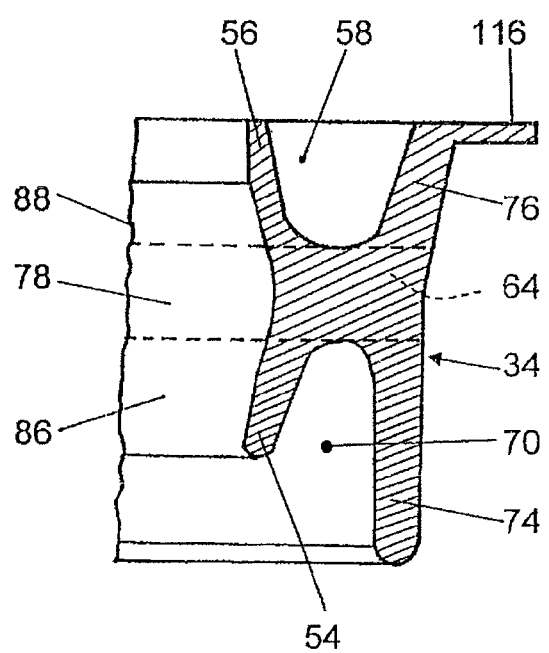
FIG. 6 is a diagram in cut-away view of part of the sealing element in accordance with FIG. 5.

FIG. 6 is a schematic depiction of the sealing element 34 with the inner and outer sealing lips 54, 56, the integrated annular part or support ring 64, and the inner and outer arms 74, 76. The free ends of the inner sealing lip 54 and of the inner arm 74 point towards the interior of the valve housing, while the free ends of the outer sealing lip 56 and the outer arm 76 point outward or towards the cover that closes off the housing opening. The contact surfaces 86, 88 of the sealing lips 54, 56 basically conform to the spherical outer surface of the liner for the expanded shaft part. In the area of their free ends the contact surfaces 86, 88 preferably conform at least in part to the essentially cylindrical shaft areas connected to the expanded shaft area that are disposed radially outward or inward. The contact surfaces 86, 88 of the inner and outer sealing lips 54, 56 are positioned with pre-specified pre-tension against the outer surfaces of the associated shaft areas or against the liner that is present on the shaft. A self-adjusting shaft seal is advantageously created in particular by the resilient rings or spring elements explained using the various exemplary embodiments. Additionally or alternatively, in accordance with the invention it is possible to adjust the sealing force or the shaft seal by means of the annular body explained in FIGS. 1, 4, and 14 and/or by the adjusting elements. The sealing element 34 is embodied and associated with the spherical outer surface of the liner such that as the pressures increase the load, the contact area increases in size and/or is displaced towards the support ring 64 as a result of an increased load. As a result, the sealing effect is increased. Thus a pressure-dependent change and/or increase in sealing power and/or increase in the size of the contact area is attained in a preferable manner.

Figure 7:
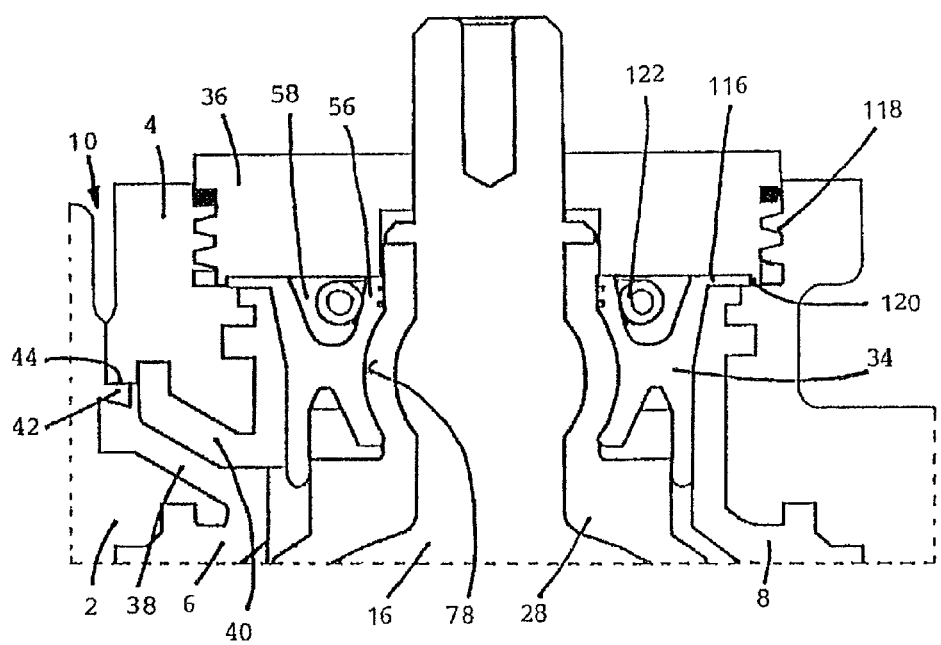
FIG. 7 is a partial axial sectional diagram of a valve, in accordance with an embodiment of the present invention.

In the exemplary embodiment in accordance with FIG. 7 the cover 36 is screwed into the housing part 4 by a thread 118 and is disposed with a bar 120 on the metal housing 4. The flange or the membrane seal 116 of the sealing element 34 is clamped between the bottom of the cover 36 and the housing 4 and also overlaps the outer end of the liner 8 so that a reliable seal is attained. The outer sealing lip 56 of the sealing element 34 is surrounded in the annular space 58 by a resilient ring 122 that presses the outer sealing lip 56 with a therefore pre-specified pre-tension against the liner 28 for the shaft 24. The end part 38 of the liner 6 and the end part 40 of the liner 8 are arranged at a pre-specified angle to the connecting area 10, preferably at an angle of about 30° to 40° to the longitudinal axis of the housing, and are sealingly positioned overlapping one another with pre-tension. Thus a functionally reliable seal is attained even when there is high pressure in the interior of the housing and/or given high temperatures or changes in temperature. When the temperature increases the inner end part 38 is pressed more strongly against the outer end part 40, and when the temperature decreases the outer end part 40 is pressed against the inner end part 38. The centering collar 42 for the housing part 2 fits exactly against the centering collar 44 for the housing part 4. The metal housing parts 2, 4 furthermore are positioned directly against one another in a radial plane, relative to the longitudinal axis of the housing, in the connecting area 10.

Figure 8:
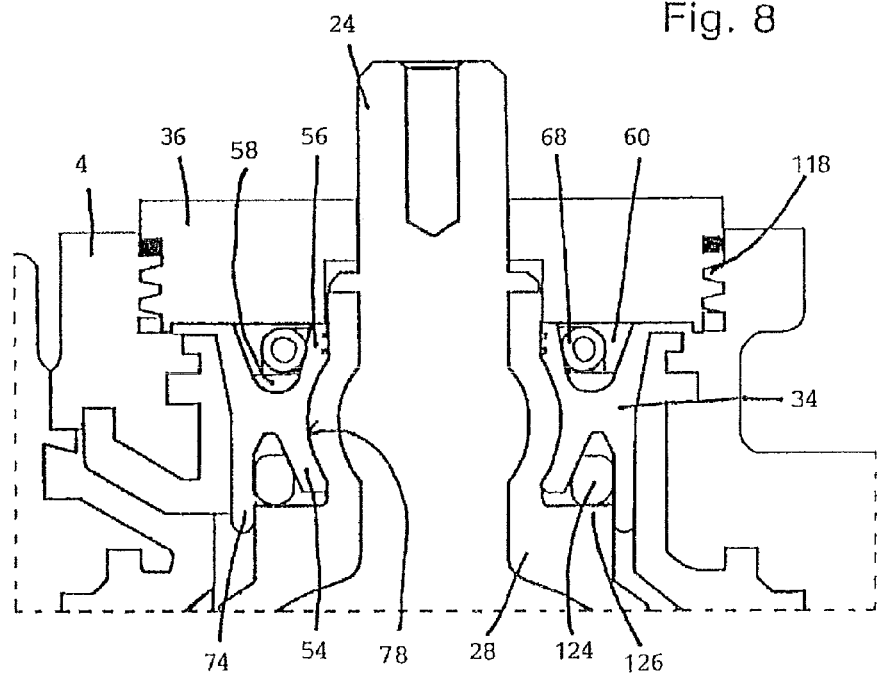
FIG. 8 is a partial axial sectional diagram of a valve, in accordance with another embodiment of the present invention.

The exemplary embodiment depicted in FIG. 8 is essentially the same as the exemplary embodiment in accordance with FIG. 2, with the annular body 60 being provided in the annular space 58, for the purpose of fixing the resilient ring 68, which pre-stresses the outer sealing lip 56. Furthermore, the lower sealing lip 54 is surrounded by a ring 124 that is also resilient. This ring 124 is also supported on an annular shoulder 126 of the liner 28 and on the inner arm 74 of the sealing element 34. As in FIG. 7, the cover 36 is joined to the housing part 4 via the thread connection 118.

Figure 9:
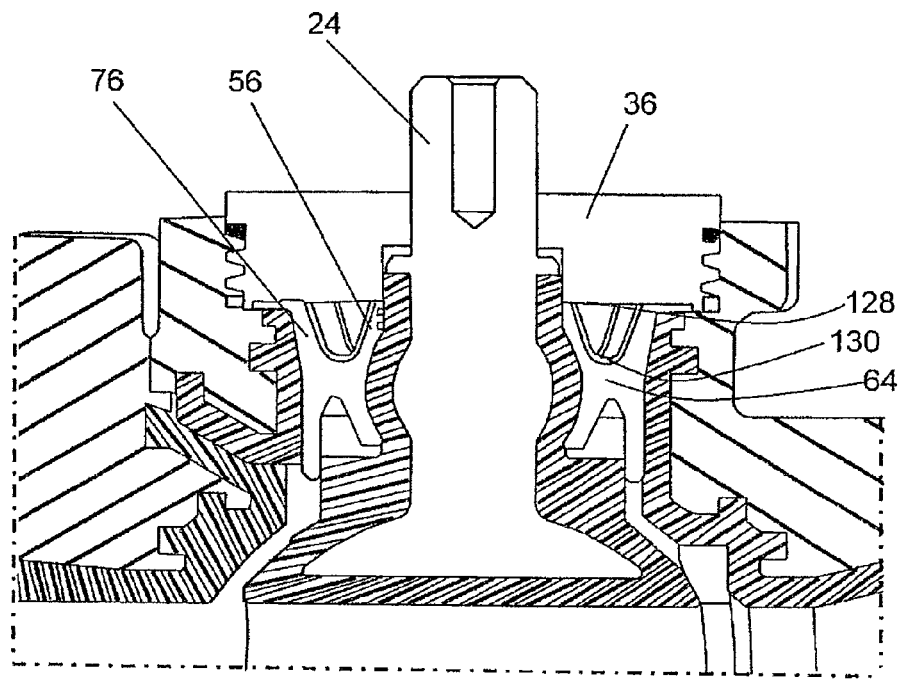
FIG. 9 is a partial axial sectional diagram of a valve, in accordance with another embodiment of the present invention.
Figure 10:
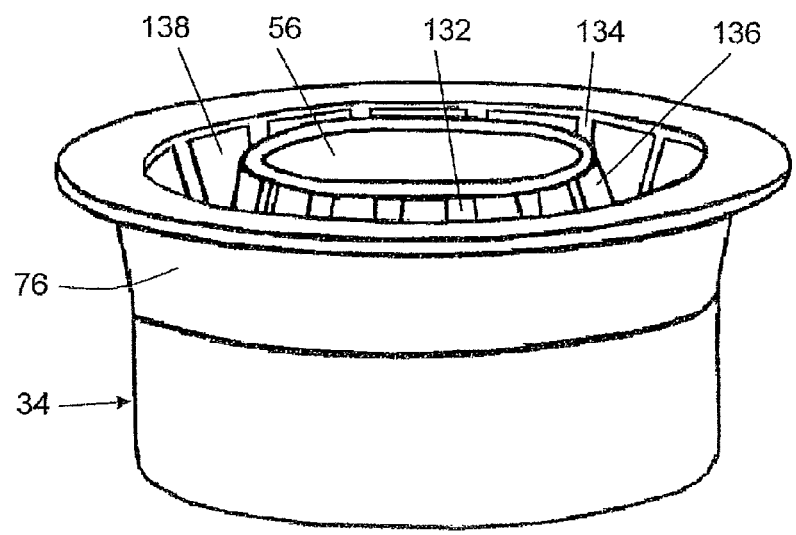
FIG. 10 is a diagram of a portion of the valve of FIG. 9.

The exemplary embodiment depicted in FIGS. 9 and 10 includes a spring element 128 that surrounds the outer sealing lip 116 of the sealing element 34. The spring element 128 has essentially a V-shape and may comprise spring steel. One side of the spring element 128 is positioned against the outer sealing lip 56. The other side is positioned against the outer arm 76 of the sealing element 34 under pre-tension. Moreover, a curved connecting part 130 of the spring element 128 is positioned on the annular part or support ring 64. The support ring 64 is additionally stiffened for the purpose of reliable support and/or bearing for the shaft 24. The connecting part 130 may be closed across the circumference. Parts of the spring element arranged toward the cover 36 essentially in a V shape are divided into segments 136, 138 in a sector-like manner by slits 132, 134 in order to facilitate the necessary conformability and/or movability for the sealing element 34.

Figure 11:
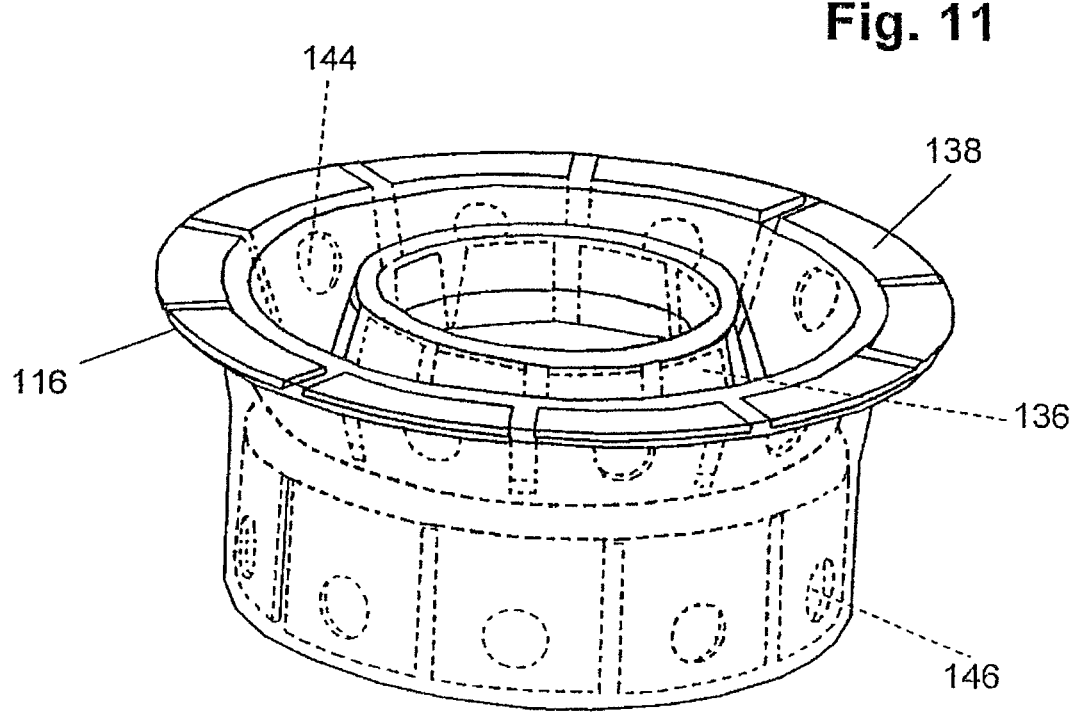
FIG. 11 is a perspective diagram of a sealing element, in accordance with another embodiment of the present invention.
Figure 12:
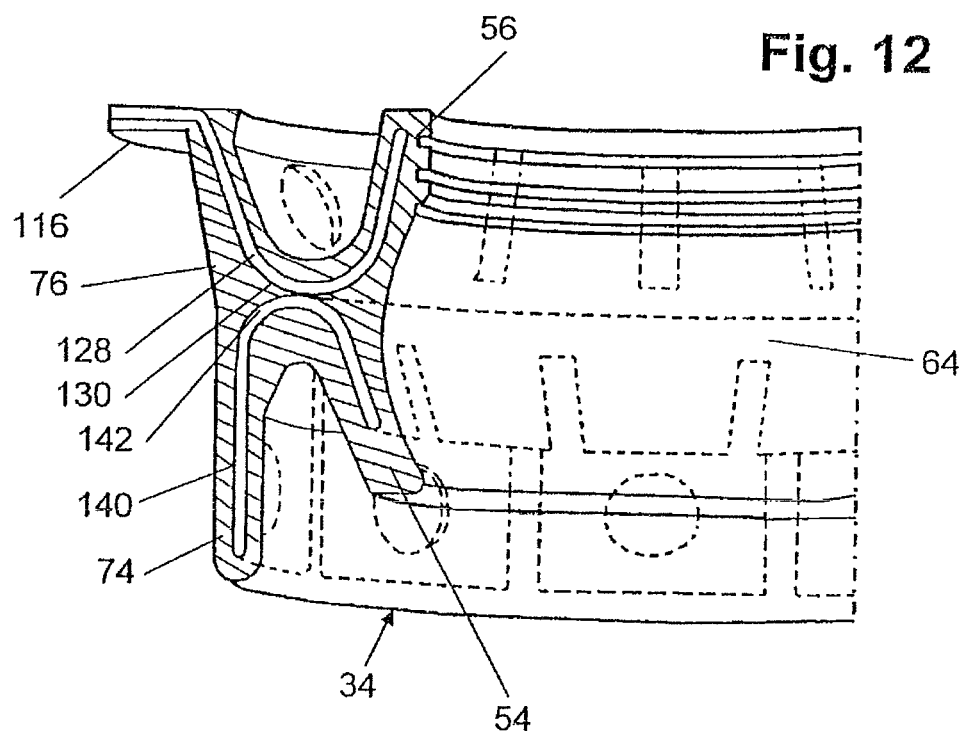
FIG. 12 is a diagram in cut-away view of part of the sealing element in accordance with FIG. 11.

One special exemplary embodiment of the sealing element 34 is depicted in FIG. 11 and FIG. 12. The sealing element 34 includes an X-shaped spring element or sealing element or two spring elements 128, 140. In various embodiments, such element are surrounded by the plastic and/or elastomer material of the sealing element 34 and/or are integrated in the plastic and/or the elastomer material. The first spring element 128, which is integrated in the outer sealing lip 56, is essentially embodied as in the prior exemplary embodiment with the annular connecting pert 130 closed across the circumference. The part integrated in the outer arm 76 extends radially outward up to the flange 116 and is free of plastic to the outside and upward in accordance with the drawing. The aforesaid division into segments 136, 138 is also provided. The second spring element 140 may be similarly embodied, but is completely integrated in the inner sealing lip 54 and the inner arm 74, and consequently protected from the flow medium. The second spring element 140 is also embodied essentially in a V shape with a connecting part 142 that is closed across the circumference. This provides additional stiffening of the annular part 64 embodied as a support ring. In addition, the second spring element 140 is also divided into segments. Both the segments 136, 138 of the first spring element 128 and the segments of the second spring element 140 include through-holes 144, 146 that are filled with plastic from the sealing element. This ensures a functionally reliable connection between the spring elements 128, 140 and the sealing element 34.

Figure 13:
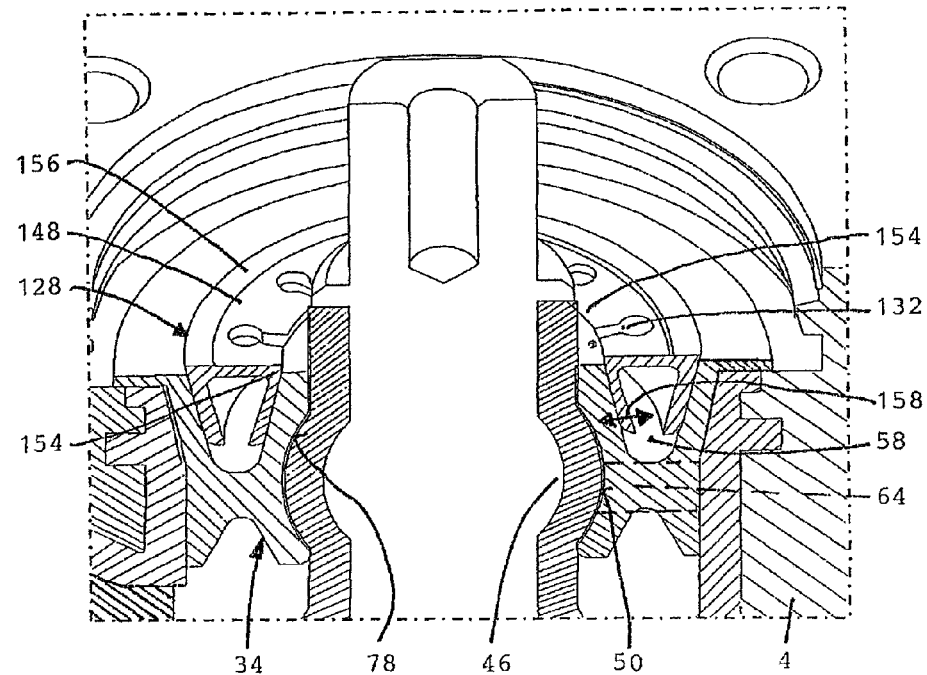
FIG. 13 is a diagram of a valve, in accordance with another embodiment of the present invention.
Figure 14:
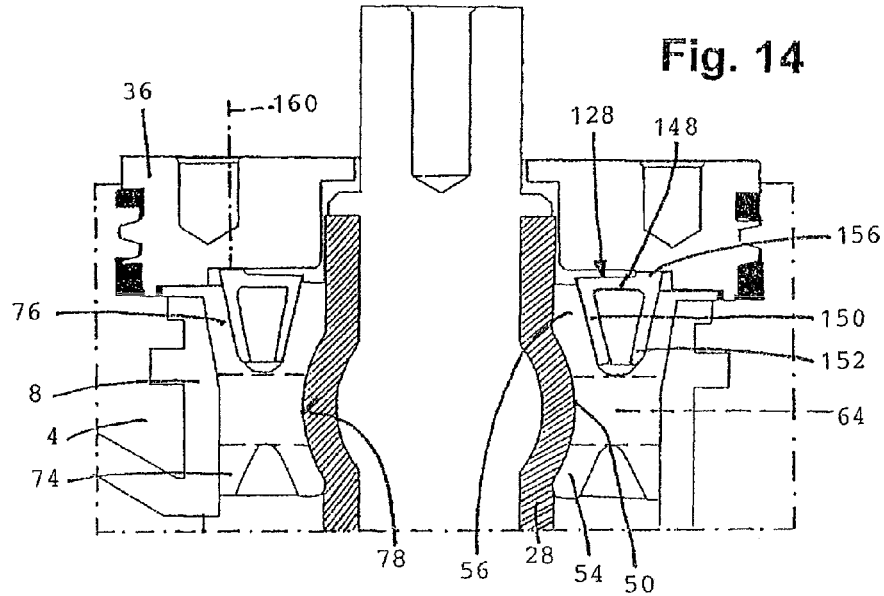
FIG. 14 is a partial axial sectional diagram of the valve of FIG. 13.

FIGS. 13 and 14 depict another embodiment of the inventive valve. Note that a cover 36 that closes off the opening 26 from the outside is not shown in FIG. 13. In this embodiment, the spherical inner surface 78 of the support ring 64 that is integrated in the sealing element 34 is positioned against the spherical outer surface 50, such as the inner sealing lip 54 and the outer sealing lip 56. The inner and outer arms 74, 76 of the X-shaped sealing element and the support ring 64 are positioned radially outward against the liner 8 of the housing part 40 and are thus supported indirectly in the housing part 4. The spring element 128 is arranged in the annular space 58 between the outer sealing lip 56 and the outer arm 76. The spring element 128 includes an annular bar 148 that faces the cover 36, a first leg 150 that is positioned radially inwardly against the outer sealing lip 56, and a second leg 152 that is positioned against the outer arm 76. The spring element 128 preferably is embodied closed across its circumference. The bar 148 and the first leg 150 include through-slits 132 such that a number of spring segments 154 are distributed across the circumference. The annular spring element 128 is fixed in the annular space 58 by the cover 36. The spring element 128 has an annular shoulder 156 located radially outward that is supported on the cover 36. The outer sealing lip 56 is pressed with pre-specified spring force against the spherical outer surface 50 by the spring element 128. The free end of the outer sealing lip 56 also is pressed against the essentially cylindrical part of the liner 28 and thus also indirectly against the shaft 24 with a pre-specified pre-tension. Because the first leg 150 is divided into the spring segments 154, in various embodiment the spring elements 154 can be deflected independently of one another; and/or as a function of the pivot angle; and/or they can exert the pre-tension on the outer sealing lip 56 as indicated by the double arrow 158. Moreover, a self-adjusting shaft seal is attained with the spring element 128, and specifically its first leg 150 and/or the aforesaid spring segments 154, so that a durable and functionally reliable seal is assured by the sealing element 34 despite abrasion or wear of the inner surface of the outer sealing lip 56 and/or the liner 28.

The pre-tension and/or the spring element 128 can be adjusted. As the dot-dash line 160 indicates, adjusting elements as explained for FIG. 1 are provided in the cover 36, usefully distributed across the circumference. When needed, the pre-tension acting on the outer sealing lip 56 by the spring element 128 can be changed and increased by such adjusting elements. The adjusting elements cooperate with the annular shoulder 156 of the spring element or support the spring element. Long tool times for the valve, with minimized leak rates, are ensured using the self-adjusting, adjustable shaft seal.

The invention claimed is:

1. A valve having a flow path for a flow medium, comprising:
   a housing having a first opening and a through-opening;
   a rotational body arranged rotatably in the housing and having a through-opening;
   first and second seat rings spaced apart in the housing, each positioned against an outer surface of the rotational body to seal against leakage of the flow medium;
   a shaft fixedly linked to the rotational body and extending outwardly through the first opening in the housing, the shaft having a spherical outer surface over at least a part of the shaft; and
   a sealing element, positioned against the spherical outer surface, comprising a sealing lip and a support ring, the support ring being significantly stiffer than the sealing lip, the support ring having a spherical inner surface with a curvature corresponding to a curvature of the shaft part's spherical outer surface, the shaft being supported on the support ring via the shaft part's spherical outer surface;
   wherein the flow path is defined by the housing through-opening and the rotational body through-opening and is either one of closed or at least partially open as determined by rotational angle position of the rotational body about a rotational axis; and
   wherein the rotational body and fixedly linked shaft move in unison to pivot about a pivot axis that is orthogonal to the rotational axis, the pivot axis being associated with the shaft part's spherical outer surface.

2. The valve of claim 1, wherein the support ring is located in the first opening and surrounds at least a portion of the shaft part.

3. A valve having a flow path for a flow medium, comprising:
   a housing having a first opening and a through-opening;
   a rotational body arranged rotatably in the housing and having a through-opening;
   first and second seat rings spaced apart in the housing, each positioned against an outer surface of the rotational body to seal against leakage of the flow medium;
   a shaft fixedly linked to the rotational body and extending outwardly through the first opening in the housing, the shaft having a spherical outer surface over at least a part of the shaft; and
   a sealing element, positioned against the spherical outer surface, comprising a sealing lip and a support ring, the support ring being significantly stiffer than the sealing lip, the support ring having a spherical inner surface with a curvature corresponding to a curvature of the shaft part's spherical outer surface, the shaft being supported on the support ring via the shaft part's spherical outer surface;

wherein the flow path is defined by the housing through-opening and the rotational body through-opening and is either one of closed or at least partially open as determined by rotational angle position of the rotational body about a rotational axis;

wherein the rotational body and fixedly linked shaft move in unison to pivot about a pivot axis that is orthogonal to the rotational axis, the pivot axis being associated with the shaft part's spherical outer surface; and wherein a cross section of the sealing element has an X shape.

4. A valve having a flow path for a flow medium, comprising:

a housing having a first opening and a through-opening;

a rotational body arranged rotatably in the housing and having a through-opening;

first and second seat rings spaced apart in the housing, each positioned against an outer surface of the rotational body to seal against leakage of the flow medium;

a shaft fixedly linked to the rotational body and extending outwardly through the first opening in the housing, the shaft having a spherical outer surface over at least a part of the shaft; and a sealing element, positioned against the spherical outer surface, comprising a sealing lip and a support ring, the support ring being significantly stiffer than the sealing lip, the support ring having a spherical inner surface with a curvature corresponding to a curvature of the shaft part's spherical outer surface, the shaft being supported on the support ring via the shaft part's spherical outer surface;

wherein the flow path is defined by the housing through-opening and the rotational body through-opening and is either one of closed or at least partially open as determined by rotational angle position of the rotational body about a rotational axis;

wherein the rotational body and fixedly linked shaft move in unison to pivot about a pivot axis that is orthogonal to the rotational axis, the pivot axis being associated with the shaft part's spherical outer surface; and wherein the sealing lip is a first sealing lip, the sealing element further comprising a second sealing lip, the first and second sealing lips being spaced apart relative to the rotational axis.

5. The valve of claim 1, wherein said significantly greater stiffness of the support ring occurs radially.

6. A valve having a flow path for a flow medium, comprising:

a housing having a first opening and a through-opening;

a rotational body arranged rotatably in the housing and having a through-opening;

first and second seat rings spaced apart in the housing, each positioned against an outer surface of the rotational body to seal against leakage of the flow medium;

a shaft fixedly linked to the rotational body and extending outwardly through the first opening in the housing, the shaft having a spherical outer surface over at least a part of the shaft; and a sealing element, positioned against the spherical outer surface, comprising a sealing lip and a support ring, the support ring being significantly stiffer than the sealing lip, the support ring having a spherical inner surface with a curvature corresponding to a curvature of the shaft part's spherical outer surface, the shaft being supported on the support ring via the shaft part's spherical outer surface;

wherein the flow path is defined by the housing through-opening and the rotational body through-opening and is either one of closed or at least partially open as determined by rotational angle position of the rotational body about a rotational axis;

wherein the rotational body and fixedly linked shaft move in unison to pivot about a pivot axis that is orthogonal to the rotational axis, the pivot axis being associated with the shaft part's spherical outer surface; and wherein the support ring is an integral component of the sealing element, an outer surface and an inner surface of the support ring each being curved and each having a center of curvature at the rotational axis.

7. A valve having a flow path for a flow medium, comprising:

a housing having a first opening and a through-opening;

a rotational body arranged rotatably in the housing and having a through-opening;

first and second seat rings spaced apart in the housing, each positioned against an outer surface of the rotational body to seal against leakage of the flow medium;

a shaft fixedly linked to the rotational body and extending outwardly through the first opening in the housing, the shaft having a spherical outer surface over at least a part of the shaft; and a sealing element, positioned against the spherical outer surface, comprising a sealing lip and a support ring, the support ring being significantly stiffer than the sealing lip, the support ring having a spherical inner surface with a curvature corresponding to a curvature of the shaft part's spherical outer surface, the shaft being supported on the support ring via the shaft part's spherical outer surface;

wherein the flow path is defined by the housing through-opening and the rotational body through-opening and is either one of closed or at least partially open as determined by rotational angle position of the rotational body about a rotational axis;

wherein the rotational body and fixedly linked shaft move in unison to pivot about a pivot axis that is orthogonal to the rotational axis, the pivot axis being associated with the shaft part's spherical outer surface; and wherein the sealing element further comprises at the sealing element's outer surface a resilient element which forms a self-adjusting, shaft seal.

8. A valve having a flow path for a flow medium, comprising:

a housing having a first opening and a through-opening;

a rotational body arranged rotatably in the housing and having a through-opening;

first and second seat rings spaced apart in the housing, each positioned against an outer surface of the rotational body to seal against leakage of the flow medium;

a shaft fixedly linked to the rotational body and extending outwardly through the first opening in the housing, the shaft having a spherical outer surface over at least a part of the shaft; and a sealing element, positioned against the spherical outer surface, comprising a sealing lip and a support ring, the support ring being significantly stiffer than the sealing lip, the support ring having a spherical inner surface with a curvature corresponding to a curvature of the shaft part's spherical outer surface, the shaft being supported on the support ring via the shaft part's spherical outer surface;

wherein the flow path is defined by the housing through-opening and the rotational body through-opening and is either one of closed or at least partially open as determined by rotational angle position of the rotational body about a rotational axis;

wherein the rotational body and fixedly linked shaft move in unison to pivot about a pivot axis that is orthogonal to the rotational axis, the pivot axis being associated with the shaft part's spherical outer surface; and wherein the sealing element further comprises an annular body that allows a sealing force between the shaft portion and the sealing element to be adjustable.

9. The valve of claim 1, wherein an interior of the housing at the first opening is lined with a fluoroplastic liner over an area closed off from outside the valve.

10. The valve of claim 1, wherein the housing comprises two housing parts joined at a connecting area, wherein an interior of the housing is lined with a fluoroplastic liner, end parts of the liner reaching from the first opening to at least the connecting area, the end parts arranged conically relative to a housing longitudinal axis and overlapping one another.

11. The valve of claim 1, wherein the housing comprises two metal housing parts coaxially arranged along a longitudinal axis of the housing, the two housing parts each having a centering collar and being located adjacent to one another in a connecting area.

12. A valve having a flow path for a flow medium, comprising:
a housing having a first opening and a through-opening;
a rotational body arranged rotatably in the housing and having a through-opening;
first and second seat rings spaced apart in the housing, each positioned against an outer surface of the rotational body to seal against leakage of the flow medium;
a shaft fixedly linked to the rotational body and extending outwardly through the first opening in the housing, the shaft having a spherical outer surface over at least a part of the shaft; and
a sealing element, positioned against the spherical outer surface, comprising a sealing lip and a support ring, the support ring being significantly stiffer than the sealing lip, the support ring having a spherical inner surface with a curvature corresponding to a curvature of the shaft part's spherical outer surface, the shaft being supported on the support ring via the shaft part's spherical outer surface;
wherein the flow path is defined by the housing through-opening and the rotational body through-opening and is either one of closed or at least partially open as determined by rotational angle position of the rotational body about a rotational axis;
wherein the rotational body and fixedly linked shaft move in unison to pivot about a pivot axis that is orthogonal to the rotational axis, the pivot axis being associated with the shaft part's spherical outer surface; and
wherein the sealing lip is pressed toward the shaft with a resilient spring to a pre-specified pre-tension.

13. A valve having a flow path for a flow medium, comprising:
a housing having a first opening and a through-opening;
a rotational body arranged rotatably in the housing and having a through-opening;
first and second seat rings spaced apart in the housing, each positioned against an outer surface of the rotational body to seal against leakage of the flow medium;
a shaft fixedly linked to the rotational body and extending outwardly through the first opening in the housing, the shaft having a spherical outer surface over at least a part of the shaft; and
a sealing element, positioned against the spherical outer surface, comprising a sealing lip and a support ring, the support ring being significantly stiffer than the sealing lip, the support ring having a spherical inner surface with a curvature corresponding to a curvature of the shaft part's spherical outer surface, the shaft being supported on the support ring via the shaft part's spherical outer surface;
wherein the flow path is defined by the housing through-opening and the rotational body through-opening and is either one of closed or at least partially open as determined by rotational angle position of the rotational body about a rotational axis;
wherein the rotational body and fixedly linked shaft move in unison to pivot about a pivot axis that is orthogonal to the rotational axis, the pivot axis being associated with the shaft part's spherical outer surface; and
wherein a cross-section of the sealing element has an X-shape with an outer arm, the sealing element further comprising a flange at the outer arm oriented radially relative to the rotational axis, the flange providing a membrane seal between a cover of the first opening and a surrounding part of the housing.

14. A valve having a flow path for a flow medium, comprising:
a housing having a first opening and a through-opening;
a rotational body arranged rotatably in the housing and having a through-opening;
first and second seat rings spaced apart in the housing, each positioned against an outer surface of the rotational body to seal against leakage of the flow medium;
a shaft fixedly linked to the rotational body and extending outwardly through the first opening in the housing, the shaft having a spherical outer surface over at least a part of the shaft; and
a sealing element, positioned against the spherical outer surface, comprising a sealing lip and a support ring, the support ring being significantly stiffer than the sealing lip, the support ring having a spherical inner surface with a curvature corresponding to a curvature of the shaft part's spherical outer surface, the shaft being supported on the support ring via the shaft part's spherical outer surface;
wherein the flow path is defined by the housing through-opening and the rotational body through-opening and is either one of closed or at least partially open as determined by rotational angle position of the rotational body about a rotational axis;
wherein the rotational body and fixedly linked shaft move in unison to pivot about a pivot axis that is orthogonal to the rotational axis, the pivot axis being associated with the shaft part's spherical outer surface; and
wherein a pivot bearing having a pivot axis is arranged in the first opening, the pivot bearing comprising the support ring and allowing relative movement between the shaft and the housing at the first opening, the support ring having a radially inner surface positioned against the outer spherical surface of the shaft part and having a radially outer surface toward a wall of the first opening.

15. The valve of claim 1, wherein the support ring includes an axial extension for surrounding the shaft part's spherical outer surface with respect to the rotational axis, wherein the pivot axis is in a direction radially through the support ring, and wherein with the shaft being supported on the support ring via the shaft part's spherical outer surface said rotational body and the shaft fixedly linked to the rotational body, the rotational body is floatingly borne in the housing.

16. The valve of claim 1, wherein the shaft bulges along at least a partial length of the shaft to define an outer surface contour having a spherical arc shape in a shaft lengthwise direction.

17. A valve having a flow path for a flow medium, comprising:
- a housing having a first opening and a through-opening;
- a rotational body arranged rotatably in the housing and having a through-opening;
- first and second seat rings spaced apart in the housing, each positioned against an outer surface of the rotational body to seal against leakage of the flow medium;
- a shaft fixedly linked to the rotational body and extending outwardly through the first opening in the housing; and
- a sealing element, positioned against the spherical outer surface, comprising a sealing lip and a support ring, the support ring being significantly stiffer than the sealing lip;
- wherein the shaft has a cross sectional area along a first partial length of the shaft defined by a first perimeter, and has an increased cross sectional area along a second partial length of the shaft defined by a second perimeter greater than said first perimeter, and wherein the support ring has an inner surface that conforms to at least said second perimeter for restricting axial and linear displacement of the shaft, while allowing rotational motion of the shaft, the shaft being supported on the support ring at the shaft part's second partial length;
- wherein the flow path is defined by the housing through-opening and the rotational body through-opening and is either one of closed or at least partially open as determined by rotational angle position of the rotational body about a rotational axis; and
- wherein the rotational body and fixedly linked shaft move in unison to pivot about a pivot axis that is orthogonal to the rotational axis, the pivot axis being associated with the shaft part's second partial length.

* * * * *